United States Patent
Yang et al.

(10) Patent No.: US 9,645,659 B2
(45) Date of Patent: May 9, 2017

(54) ELECTRONIC DEVICE WITH A SUPPORTING DEVICE FOR MODE SWITCHING

(71) Applicants: Beijing Lenovo Software Ltd., Beijing (CN); Lenovo (Beijing) Co., Ltd., Beijing (CN)

(72) Inventors: Zhe Yang, Beijing (CN); Changyu Sun, Beijing (CN); Ning Le, Beijing (CN); Liyuan Gan, Beijing (CN); Fenglang Li, Beijing (CN)

(73) Assignees: Beijing Lenovo Software Ltd., Beijing (CN); Lenovo (Beijing) Co., Ltd., Bejing (CN)

( * ) Notice: Subject to any disclaimer, the term of this patent is extended or adjusted under 35 U.S.C. 154(b) by 11 days.

(21) Appl. No.: 13/874,665

(22) Filed: May 1, 2013

(65) Prior Publication Data
US 2013/0293497 A1    Nov. 7, 2013

(30) Foreign Application Priority Data

May 7, 2012  (CN) .......................... 2012 1 0139170

(51) Int. Cl.
*G06F 3/041*  (2006.01)
*F16M 11/38*  (2006.01)
(Continued)

(52) U.S. Cl.
CPC ............. *G06F 3/041* (2013.01); *F16M 11/10* (2013.01); *F16M 11/2021* (2013.01);
(Continued)

(58) Field of Classification Search
CPC .... F16M 11/38; F16M 11/10; F16M 11/2021; G06F 1/1681; G06F 1/1675; G06F 1/1677; G06F 1/1616; G06F 1/1618; G06F 1/162
See application file for complete search history.

(56) References Cited

U.S. PATENT DOCUMENTS 7,239,505 B2    7/2007  Keely et al.
7,894,865 B2    2/2011  Kim
(Continued)

FOREIGN PATENT DOCUMENTS

CN    1784133 A     6/2006
CN    1925511 A     3/2007
JP    2009222556 A * 10/2009

OTHER PUBLICATIONS

First Chinese Office Action regarding Application No. 201210139170.9 dated Dec. 3, 2015. English translation provided by Unitalen Attorneys at Law.

*Primary Examiner* — Dwayne Bost
*Assistant Examiner* — Maheen Javed
(74) *Attorney, Agent, or Firm* — Harness, Dickey & Pierce, P.L.C.

(57) ABSTRACT

The present application provides an electronic device having a first operating mode and a second operating mode, and including a body; a first rotating structure connected with the body; a supporting part connected with the body via the first rotating structure; a second rotating structure; a base connected with the supporting part via the second rotating structure. Specifically, the body is substantially perpendicular to the base when the electronic device is in the first operating mode; and the body is substantially parallel to the base when the electronic device is in the second operating mode.

7 Claims, 4 Drawing Sheets

(51) Int. Cl.
*F16M 11/10* (2006.01)
*F16M 11/20* (2006.01)
*G06F 1/16* (2006.01)

(52) U.S. Cl.
CPC ............ *F16M 11/38* (2013.01); *G06F 1/162* (2013.01); *G06F 1/1677* (2013.01); *G06F 1/1681* (2013.01)

(56) References Cited

U.S. PATENT DOCUMENTS

| | | | |
|---|---|---|---|
| 8,196,264 B2* | 6/2012 | Zhou | G06F 1/1637 |
| | | | 16/321 |
| 2006/0077622 A1 | 4/2006 | Keely et al. | |
| 2007/0060217 A1 | 3/2007 | Kim | |
| 2007/0183123 A1* | 8/2007 | Chuan et al. | 361/679 |
| 2008/0094792 A1* | 4/2008 | Chen et al. | 361/681 |
| 2010/0289763 A1* | 11/2010 | Liao et al. | 345/173 |
| 2011/0297566 A1* | 12/2011 | Gallagher et al. | 206/320 |
| 2012/0162926 A1* | 6/2012 | Duan | G06F 1/1681 |
| | | | 361/727 |
| 2012/0188726 A1* | 7/2012 | Nonaka et al. | 361/727 |
| 2012/0250241 A1* | 10/2012 | Minemura et al. | 361/679.21 |
| 2013/0087517 A1* | 4/2013 | Zhong | 211/26 |
| 2013/0127730 A1* | 5/2013 | Lee et al. | 345/169 |
| 2013/0239367 A1* | 9/2013 | Chung | G06F 1/1681 |
| | | | 16/302 |

\* cited by examiner

ELECTRONIC DEVICE WITH A SUPPORTING DEVICE FOR MODE SWITCHING

CROSS REFERENCE TO RELATED APPLICATIONS

The present application claims priority to Chinese Patent Application No. 201210139170.9, filed with the Chinese State Intellectual Property Office on May 7, 2012, the entire disclosure of which is incorporated herein by reference.

FIELD OF THE INVENTION

The present application relates to the field of electronic technology, and particularly to an electronic device.

BACKGROUND OF THE INVENTION

With the continuous development in electronic technology, electronic devices have more functions. The electronic device may be operated either by means of an external input interface, or by using a touch device. The electronic device is provided with a supporting device connected thereto, through which, the position of the electronic device is adjusted, for example, changing the position of the screen or lowering the height of the screen is performed, so as to adjust the electronic device to a state suitable for use.

However, in the process of achieving the present application, the inventors have discovered that through the conventional supporting device connected with the electronic device, merely the positional relationship of the electronic device can be adjusted independently, while the modes of the electronic device cannot be switched further.

SUMMARY OF THE INVENTION

In view of this, the present application provides an electronic device for solving the technical problem of adjusting mode switching of the electronic device by a supporting device.

One aspect of the present application provides an electronic device, which has a first operating mode and a second operating mode, including a body; a first rotating structure connected with the body; a supporting part connected with the body via the first rotating structure; a second rotating structure; a base connected with the supporting part via the second rotating structure; wherein the body is substantially perpendicular to the base when the electronic device is in a first operating mode; and the body is substantially parallel to the base when the electronic device is in a second operating mode.

Optionally, the electronic device further includes a detecting unit for detecting the angle position among the body, the supporting part and the base.

Optionally, the electronic device further includes a state switching unit for switching the electronic device into the first operating mode when the angle position among the body, the supporting part and the base meets a first angle position; and controlling the electronic device to be in the second operating mode when the angle position among the body, the supporting part and the base meets a second angle position.

Optionally, the supporting part further includes: a connecting rod for enabling the body, the supporting part and the base to move jointly and synchronously.

Optionally, when the connecting rod is used for enabling the body, the supporting part and the base link to move jointly and synchronously, the detecting unit is arranged at the first rotating connection structure or the second rotating structure, and used for specifically detecting the angle position between the body and the supporting part or the angle position between the supporting part and the base.

Optionally, the state switching unit is specifically used for: switching the electronic device into the first operating mode when the detecting unit is arranged in the first rotating connection structure and has detected that the angle position between the body and the supporting part meets the first angle position; and switching the electronic device into the second operating mode when the detecting unit is arranged in the second rotating connection structure and has detected that the angle position between the supporting part and the base meets the second angle position.

Optionally, when the first operating mode is specifically a desktop computer mode, the electronic device further includes: an input apparatus interface and an input apparatus that is connected with the input apparatus interface and in an enabled state; a touch function switch unit connected with the detecting unit and a touch sensing unit for generating an instruction for deactivating the touch function based on the angle detected by the detecting unit so as to disable the touch sensing unit.

Optionally, when the second operating mode is specifically a tablet mode, the touch function switch unit is further used for generating an instruction for activating the touch function based on the angle detected by the detecting unit so as to enable the touch sensing unit.

In another aspect, the present application provides an electronic device including: a display; a bracket connected with the display for supporting the display; a processing unit arranged in the display for determining the operating mode of the electronic device in terms of the positional relationship between the bracket and the display.

Optionally, the processing unit is specifically used for adjusting the electronic device to be in the first operating mode when the bracket is substantially perpendicular to the display; and adjusting the electronic device to be in the second operating mode when the bracket is substantially parallel to the display.

One or more of the above-mentioned technical solutions have the following technical effects or advantages:

According to the electronic device of the present application, the angle position among the body, the supporting part and the base is detected by the detecting unit, and the operating modes of the electronic device are switched by the switching unit in terms of the angle position, so that the technical problem that only the position of the electronic device may be changed independently and the modes of the electronic device may not be switched by means of changing the position of electronic device in the prior art is solved, thereby achieving the technical effects of switching the modes of the electronic device according to the changing of the angle position among the body, the supporting part and the base.

Further, the electronic device of the present application can be switched between different modes when the position of electronic device meets a certain range of angle.

Further, in different modes, the electronic device of the present application can be operated by different equipments.

DETAILED DESCRIPTION OF THE INVENTION

In order to solve the technical problem of adjusting the mode switching of the electronic device in terms of the angle position among the body, the supporting part and the base, embodiments of the present application put forward an electronic device and its using method, hereinafter, the main implementing principle, concrete implementing process and the beneficial effects which can be correspondingly achieved will be described in detail in conjunction with the drawings of the specification.

Embodiment 1

Figure 1:
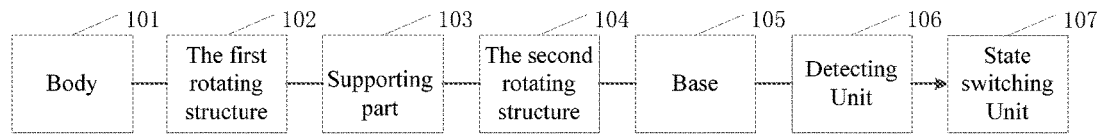
FIG. 1 is a schematic view showing the function of the electronic device according to an embodiment of the present application.

Referring to FIG. 1, in which an electronic device having a first operating mode and a second operating mode is described. Specifically, the electronic device includes a body 101; a first rotating structure 102; a supporting part 103; a second rotating structure 104; and a base 105.

The first rotating structure 102 is connected with the body 101. The supporting part 103 is connected with the body 101 via the first rotating structure 102. The base 105 is connected with the supporting part 103 via the second rotating structure 104.

The body 101 is substantially perpendicular to the base 105 when the electronic device is in the first operating mode; and the body 101 is substantially parallel to the base 105 when the electronic device is in the second operating mode.

Further, the electronic device further includes a detecting unit 106 and a state switching unit 107 in addition to the above-mentioned parts.

Wherein the detecting unit 106 is used for detecting the angle position among the body 101, the supporting part 103 and the base 105.

The state switching unit 107 is used for switching the electronic device into the first operating mode when the angle position among the body 101, the supporting part 103 and the base 105 meets the first angle position; and controlling the electronic device to be in the second operating mode when the angle position among the body 101, the supporting part 103 and the base 105 meets the second angle position.

Figure 2:
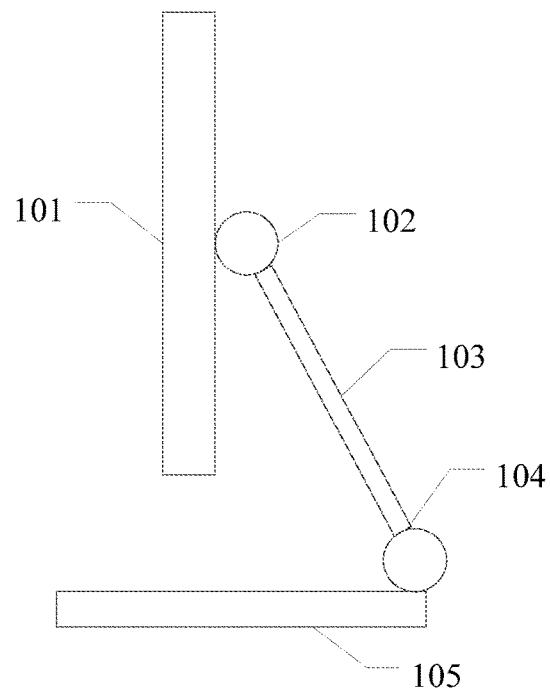
FIG. 2 is a structural view of the electronic device according to an embodiment of the present application.

Further, a view of specific function modules of the electronic device is described in FIG. 1, and the specific structural view of the electronic device is shown in FIG. 2.

Figure 3:
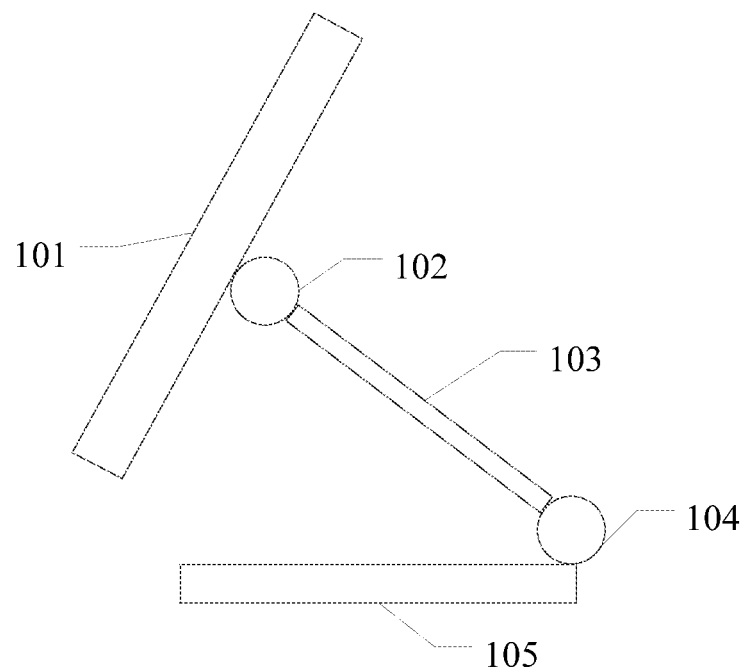
FIG. 3 is a structural view of the electronic device according to an embodiment of the present application.
Figure 4:
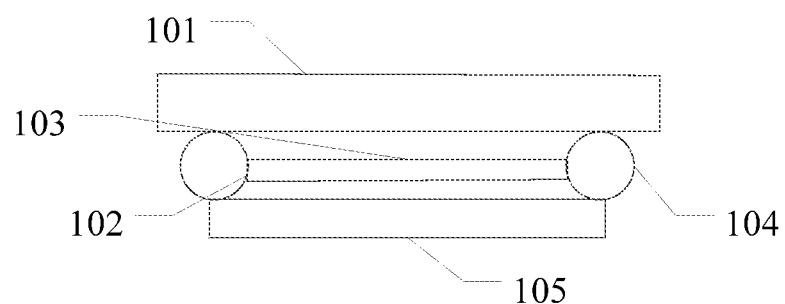
FIG. 4 is an structural view of the electronic device according to an embodiment of the present application.

FIGS. 2 to 4 are three schematic views showing three states of the body 101 in the process of being adjusted by rotating with the supporting part utilized as a connection rod in an specific embodiment of the present application. In FIG. 2, the body 101 is substantially perpendicular to the base 105, one end of the supporting part 103 is connected with the body 101 via the first rotating structure 102, and the other end of the supporting part 103 is connected with the base 105 via the second rotating structure 104. This operating mode is the first operating mode of the electronic device and is the ordinary state in which the electronic device is used by a user. In this state, the body 101 is upright so as to be convenient for a user to watch, and this state may be an initial state of the adjustment by rotating. When the user rotates the body 101, the body 101 is rotated in a clockwise direction with respect to the supporting part 103, at this moment, under the action of the first rotating structure 102 and the second rotating structure 104, the supporting part 103 may rotate in a counter-clockwise direction with respect to the base 105, pass through the state shown in FIG. 3 and rotate to the operating mode shown in FIG. 4, that is the final state, in which, the body 101, the supporting part 103 and the base 105 are placed in parallel with respect to each other.

During rotating from the mode in which the body 101 is perpendicular to the base 105 to the mode in which the body 101 is parallel to the base 105, the distance between the two rotating structures located on the supporting part 103 is relatively long, therefore, when rotating the body 1 and the supporting part 103 respectively to implement the above process, the center-of-gravity is inclined to be shifted. Consequently, for enabling the body 101, the supporting part 103 and the base 105 to move jointly and synchronously, an specific adjustment is made to the electronic equipment, which is as shown in FIG. 5.

Figure 5:
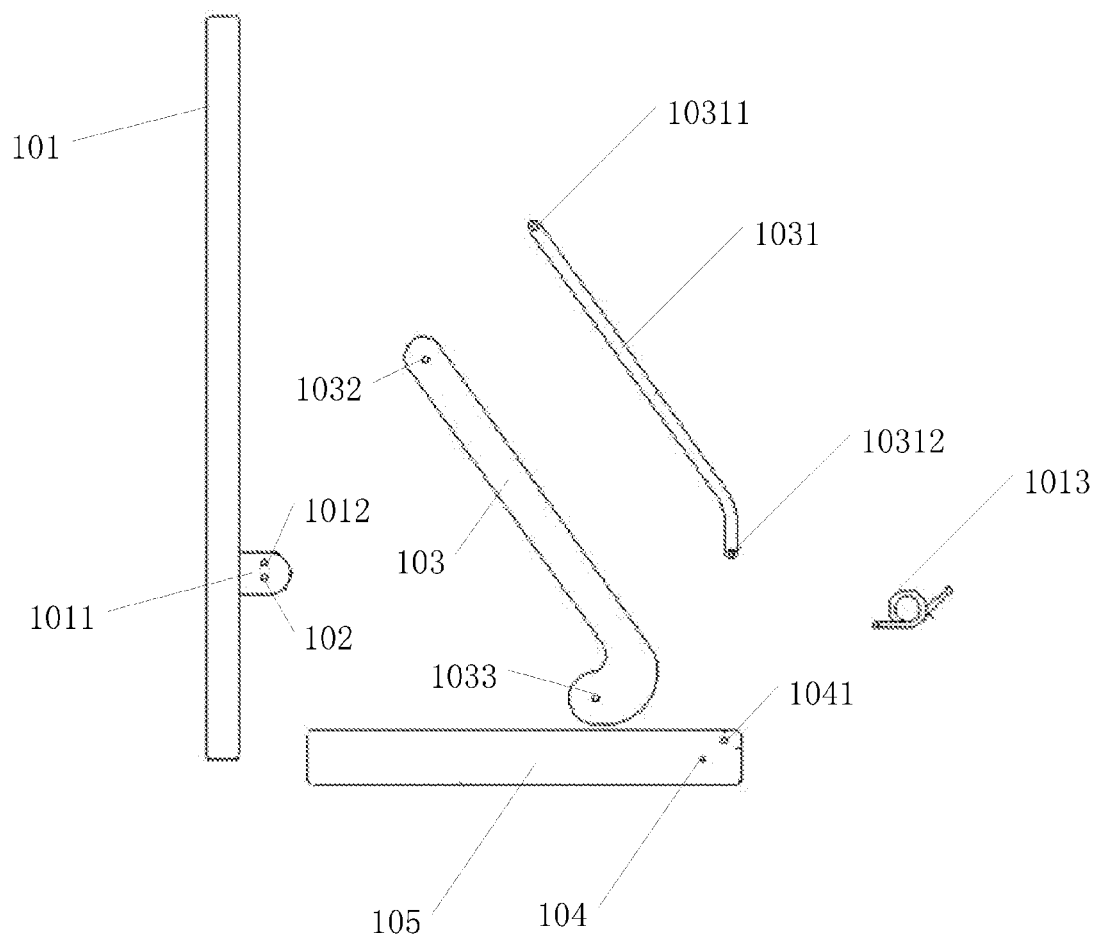
FIG. 5 is an structural view of the electronic device according to an embodiment of the present application.

Referring to FIG. 5, in addition to the body 101, the first rotating structure 102, the supporting part 103, the second rotating structure 104 and the base 105 described above, a supporting rod 1031 is further provided. According to the embodiment of the present application, the supporting rod 1031 has two ends, with the first end having a shaft sleeve 10311 and the second end having a shaft sleeve 10312.

The above-mentioned structure in FIG. 5 is described hereinafter.

According to the embodiment of the present application, the body 101 includes a display screen for displaying the images, and has a protruding part 1011 on the body 101 with the first rotating structure 102 and the first rotating shaft 1012 being arranged in different positions of the protruding part 1011 and in disalignment.

The supporting part 103 for supporting the body 101 includes a first end having a shaft sleeve 1032 and a second end having a shaft sleeve 1033.

The base 105 for firmly placing the body 101 is provided with the second rotating structure 104 and the second rotating shaft 1041 which are in disalignment.

The supporting rod 1031 includes a first end having a shaft sleeve 10311 and a second end having a shaft sleeve 10312.

According to the embodiment of the present application, when assembling and mounting the electronic device: sleeving the shaft sleeve 1032 of the first end of the supporting part 103 on the first rotating structure 102, and sleeving the shaft sleeve 1033 of the second end of the supporting part 103 on the second rotating structure 104. The supporting part 103 is rotatable with respect to the body 101 by means of the first rotating structure 102; and the supporting part 103 is rotatable with respect to the base 105 by means of the second rotating structure 104. Since the supporting part 103 may be used to support the body 101, when the body 101 is placed in the state shown in FIG. 2, the friction force between the supporting part 103 and the first rotating structure 102 should be big enough to ensure that the body 101 can be fixed in the angle of inclination as is shown in FIG. 2 and the friction force between the supporting part 103 and the second rotating shaft 131 should be big enough to ensure that the supporting part 103 can be fixed in the angle of inclination as is shown in FIG. 2, therefore, in the case that the body 101 is rotated with respect to the supporting part 103, or the supporting part 103 is rotated with respect to the base 105, a certain rotating force is required to be applied for the both cases.

Moreover, sleeving the shaft sleeve 10311 of the first end of the supporting rod 1031 on the first rotating shaft 1012, and sleeving the shaft sleeve 10312 of the second end of the supporting rod 1031 on the second rotating shaft 1041. The supporting rod 1031 is rotatable with respect to the body 101 by means of the first rotating shaft 1012; and the supporting rod 1031 is rotatable with respect to the base 105 by means of the second rotating shaft 1041.

According to the embodiment of the present application, the supporting rod 1031 is provided for cooperating with the supporting part 103. When moving the body 101 by a user, since there is a rotation of the body 101 and the supporting rod 1031 with respect to each other, a rotating moment is generated for pushing the supporting part 103, so that the supporting part 103 is rotated with respect to the base 105 by means of the second rotating structure 104. In this case, by the rotation of the body 101 with respect to the supporting part 103 and the supporting rod 1031, the supporting part 103 and the supporting rod 1031 are driven to rotate with respect to the base 105 respectively.

Furthermore, when moving the body 101 to rotate clockwise, a moment is generated for pushing the supporting part 103 and the supporting rod 1031 to rotate in a counter-clockwise direction, as a result, the supporting part 103 and the supporting rod 1031 are rotated in a counter-clockwise direction.

It may be known from the above-mentioned structure, simply by moving the body 101 which enables the rotating of the body 101, the supporting part 103 and the supporting rod 1031 to drive the supporting part 103 and the supporting rod 1031 to rotate with respect to the base 105, the state shown in FIG. 2 can then be adjusted to the state shown in FIG. 4, and since the display device 110 and the supporting rod 1031 are moved jointly, in any one of the states shown in FIG. 2 to FIG. 4, the center of gravity of the body 101 is always located within the predetermined space without deviating from the scope supported by the base 105.

Moreover, as is shown in FIG. 5, the body 101 of the first embodiment of the present application further includes a supporting spring 1013 for supporting the supporting part 103 and providing an elastic force for turning of the supporting part 103, so that the supporting part 103, when being fixed in an angle of inclination, may keep stable and have no rotation. Hence, by the friction force between the supporting part 103 and the first rotating structure 102, the friction force between the supporting part 103 and the second rotating structure 104 and the supporting force of the supporting spring 1013, when the body 101 is in any one state, it is always ensured that the supporting part 103 and the body 101 are maintained in the state stably and may not be turned at any time.

It should be noted that, among the embodiments of the present application, the embodiment as shown in FIG. 5, in which the supporting rod is used to achieve joinly moving of the supporting part 103 and the supporting rod 1031 including respectively rotating of the both with respect to the base 130 driven by the rotating of the body 101 with respect to the supporting part 103 and the supporting rod 1031 in the electronic device, and the supporting spring is used to prevent the electronic device from turning, are just illustrations and explanations of the present application and are not used to limit the present application. In addition to these, other structures may also be used to realize the jointly moving in the present application, for example a conveyer belt provided on the supporting part 103 or a parallel supporting rod, and other configurations may also be used to prevent the electronic device from turning, such as the combination of the gear structures or the combination of a rotating wheel and a conveyer belt (for example, a belt or a chain) being used at the second rotating structure 104, which are omitted for simplicity hereinafter.

When the body 101, the supporting part 103 and the base 105 can be moved jointly and synchronously, as the body 101 moves by an external force, the angle between the body 101 and the supporting part 103 and the angle between the supporting part 103 and the base 105 will have a relationship with each other, and in this case, the detecting unit may be either provided on the first rotating structure 102 or on the second rotating structure 104.

Further, the detecting unit 106, when being arranged on the first rotating structure 102, detects the angle position between the body 101 and the supporting part 103, and when being arranged on the second rotating structure 104, detects the angle position between the supporting part 103 and the base 105.

And the state switching unit 107 switches the state of the electronic device in terms of the position detected by the detecting unit 106.

The electronic device is switched into the first operating mode when the detecting unit 106 is arranged in the first rotating structure 102 and has detected that the angle position between the body 101 and the supporting part 103 meets the first angle position.

The electronic device is switched into the second operating mode when the detecting unit 106 is arranged in the second rotating structure 104 and has detected that the angle position between the supporting part 103 and the base 105 meets the second angle position.

In the description of the above-mentioned embodiment, when the supporting part 103 is specifically a connecting rod, the body 101, the supporting part 103 and the base 105 are enabled to move jointly and synchronously, so that the detecting unit 106 and the state switching unit 107 will detect the angle position of the electronic device and according to which, the mode of the electronic device is switched, in addition, when the first operating mode is set to be in a desktop computer mode and the second operating mode is set to be in a tablet mode, the electronic device further has parts having other functions.

When the first operating mode is specifically a desktop computer mode, the electronic device further includes an input apparatus interface and an input apparatus which is connected with the input apparatus interface and in an enabled state.

A touch function switch unit is connected with the detecting unit 106 for generating an instruction for deactivating the touch function based on the angle detected by the detecting unit so as to disable the touch sensing unit.

When the second operating mode is specifically a tablet mode, the touch function switch unit is further used for generating an instruction for activating the touch function based on the angle detected by the detecting unit so as to enable the touch sensing unit.

It should be noted that the above-mentioned embodiment is merely used to illustrate and explain the present application, and not to limit the present application, however, in the embodiment of the present application, in addition to the above desktop computer mode and the tablet mode, there may be other modes such as a dual mode with both the desktop computer mode and the tablet mode, when the detecting unit 106 detects that the electronic device moves to a certain angle position, the state switching unit 107 can switch the electronic device into the dual mode.

In the above-mentioned embodiment, when the electronic device in a horizontal plane changes the angle position, with the jointly and synchronous moving of the body 101, the supporting part 103 and the base 105, the detecting unit 106 is capable of detecting the angle position of the electronic device wherever being arranged in the first rotating structure 102 or being arranged in the second rotating structure 104, thereby the modes in the electronic device can be switched via the state switching unit.

In addition to the above-mentioned manners of changing the operating mode of the electronic device, there are other manners of changing the modes of the electronic device, which are described in detail in the following embodiment.

Embodiment 2

In the embodiment 2, a second manner of changing the operating mode of the electronic device is described specifically, this manner is different from that of the above-mentioned embodiment in that, a first detecting unit 106 is provided at the first rotating structure 102 for detecting whether the body 101 is brought into the first angle position, a second detecting unit 106 is provided at the second rotating structure 104 for detecting whether the body 101 is brought into the second angle position, and since the supporting part 103 has no function of the connecting rod, so when the body 101 is rotated in a clockwise direction with respect to the supporting part 103, the supporting part 103 may not be driven to rotate in a counter-clockwise direction, and merely the body 101 moves.

Figure 6:
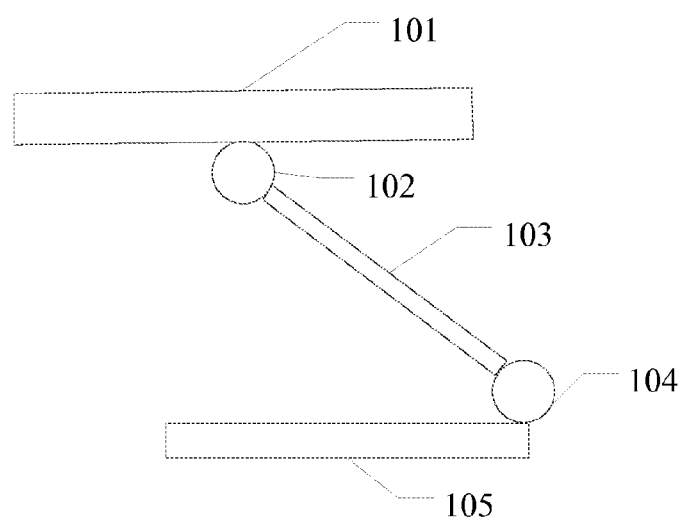
FIG. 6 is an structural view of the electronic device according to an embodiment of the present application.

As is shown in FIG. 2, the body 101 is substantially perpendicular to the base 105, one end of the supporting part 103 is connected with the body 101 via the first rotating structure 102, and the other end of the supporting part 103 is connected with the base 105 via the second rotating structure 104. This operating mode is the first operating mode of the electronic device and is the ordinary state in which the electronic device is used by a user. In this state, the body 101 is upright so as to be convenient for a user to watch; and this state may be an initial state of the adjustment by rotating. When the user rotates the body 101, the body 101 is rotated in a clockwise direction with respect to the supporting part 103, however, since at this moment the supporting part 103 has no jointly moving, therefore, only the body 101 is rotated with respect to the supporting part 103 till reaching the state shown in FIG. 6, and in FIG. 6, the supporting part 103 retains in the original state, and the body 101 is parallel to the base 105.

To rotate the supporting part 103, an external force is applied to the supporting part 103, in this case, the supporting part 103 may rotate in a counter-clockwise direction with respect to the base 105 and rotate to the operating mode shown in FIG. 4, namely, the final state, in which the body 101, the supporting part 103 and the base 105 are placed in parallel with respect to each other.

Further, when the body 101 is started to rotate, the first detecting unit 106 will determine that the body 101 has arrived the first angle position, then the state switching unit 107 may determine that the body 101 is in the first operating mode according to the determination of the first detecting unit 106, when the body 101 is rotated to the second angle position, the second detecting unit 106 provided in the second rotating structure 104 can determine that the body 101 is in the second angle position, and then the state switching unit 107 will adjust the electronic device from the first operating mode to the second operating mode.

Specifically, the particular modes of the first operating mode and the second operating mode are the same as those of the above-mentioned embodiment 1, the description of which is therefore omitted for simplicity in this embodiment.

Embodiment 3

In addition to the above-mentioned embodiments, the detecting unit 106 may be further improved, so as to be enabled to detect whether the electronic device is connected with a external equipment (for example, a keyboard, mouse), the electronic device will be determined in the first operating mode if it is connected with the external equipment, and in the second operating mode if it is not connected with the external equipment.

In order to switch the operating modes of the electronic device, the body 101 of the electronic device may be provided with a detecting unit 106 to detect whether the electronic device is connected with the external equipment, and when the detecting unit 106 detects that the electronic device is connected with the external equipment, the state switching unit 107 switches the electronic device into the first operating mode, and when the electronic device is not connected with the external equipment, the state switching unit 107 switches the electronic device into the second operating mode.

Specifically, the particular modes of the first operating mode and the second operating mode are the same as those of the above-mentioned embodiment 1, the description of which is therefore omitted for simplicity in this embodiment.

Embodiment 4

Figure 7:
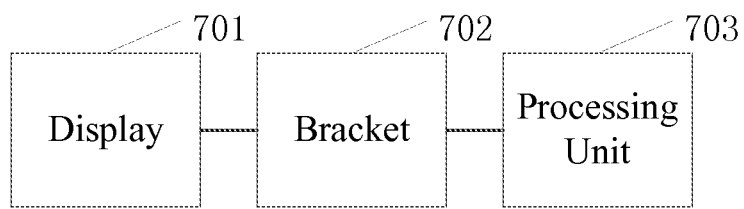
FIG. 7 is a schematic view showing the function of the electronic device according to an embodiment of the present application.

In the embodiment 4, an electronic device as shown in FIG. 7 is described including:

a display 701;

a bracket 702 connected with the display 701 for supporting the display 701;

a processing unit 703 arranged in the display 701 for determining the operating mode of the electronic device in terms of the positional relationship between the bracket 702 and the display 701.

Further, the processing unit 703 is specifically used for adjusting the electronic device to be in the first operating mode when the bracket 702 is substantially perpendicular to the display 701; and adjusting the electronic device to be in the second operating mode when the bracket 702 is substantially parallel to the display 701.

The following technical effects may be realized by means of one or more embodiments of the present application:

According to the electronic device of the present application, the angle position among the body, the supporting part and the base is detected by the detecting unit and the operating modes of the electronic device are switched by the switching unit in terms of the angle position, so that the technical problem that only the position of the electronic device can be changed independently and the modes of the electronic device can not be switched by means of changing the position of electronic device in the prior art is solved, thereby achieving the technical effects of switching the modes of the electronic device in terms of the changing of the angle position among the body, the supporting part and the base.

Further, the electronic device of the present application can be switched between different modes when the position of electronic device meets a certain range of angle.

Further, the electronic device of the present application can be operated by different equipments when in different modes.

Apparently, various modification and variations can be made by those skilled in the art without departing from the spirit and the scope of the application. Therefore, if these modifications and variations fall within the scopes of the claims and the equivalent technology of the present application, these modification and variations are also intended to be embraced within the present application.

The invention claimed is:

1. An electronic device having a first operating mode and a second operating mode, comprising:
   a body, containing a display;
   a first rotating structure connected with the body;
   a supporting part connected with the body via the first rotating structure;
   a second rotating structure;
   a base connected with the supporting part via the second rotating structure;
   wherein the body is substantially perpendicular to the base when the electronic device is in the first operating mode; and the body is substantially parallel to the base and the supporting part when the electronic device is in the second operating mode; and
   the supporting part is specifically a connecting rod used for enabling the body, the supporting part and the base to move jointly and synchronously;
   the first operating mode of the electronic device is an initial state of an adjustment by rotating, and
   when the body is rotated in a clockwise direction with respect to the supporting part, under an action of the first rotating structure and the second rotating structure, the supporting part is rotated in a counter-clockwise direction with respect to the base to turn the electronic device to be in the second operating mode which is the final state of adjustment by rotating,
   wherein a state switching unit is specifically used for:
   switching the electronic device into the first operating mode when the detecting unit is arranged at the first rotating connection structure and has detected that the angle position between the body and the supporting part meets the first angle position; and
   switching the electronic device into the second operating mode when the detecting unit is arranged at the second rotating connection structure and has detected that the angle position between the supporting part and the base meets the second angle position.

2. The electronic device according to claim 1, wherein when the connecting rod is used for enabling the body, the supporting part and the base to move jointly and synchronously, the detecting unit is arranged at the first rotating connection structure or at the second rotating structure, and is specifically used for detecting the angle position between the body and the supporting part or the angle position between the supporting part and the base.

3. The electronic device according to claim 1, wherein the electronic device further comprises:
   an input apparatus interface and an input apparatus which is connected with the input apparatus interface and in an enabled state;
   a touch function switch unit for generating an instruction for deactivating the touch function based on the angle detected by the detecting unit so as to disable the touch sensing unit.

4. The electronic device according to claim 3, wherein when the second operating mode is specifically a tablet mode, the touch function switch unit is further used for generating an instruction for activating the touch function based on the angle detected by the detecting unit so as to enable the touch sensing unit.

5. The electronic device according to claim 1, wherein the surface of the body is substantially parallel to the surface of the base and the supporting part and facing the surface of the base, and the display surface of the display is facing away from the base, when the electronic device is in the second operating mode.

6. An electronic device, comprising:
   a display;
   a bracket connected with the display for supporting the display;
   a processing unit arranged in the display for determining an operating mode of the electronic device in terms of the positional relationship between the bracket and the display; and
   the bracket is specifically a connecting rod used for enabling the body, the supporting part and the base to move jointly and synchronously;
   wherein a first operating mode of the electronic device is an initial state of an adjustment by rotating, and
   when the body is rotated in a clockwise direction with respect to the bracket, the bracket is rotated in a counter-clockwise direction with respect to the base to turn the electronic device to be in a second operating mode which is the final state of adjustment by rotating,
   wherein a state switching unit is specifically used for:
   switching the electronic device into the first operating mode when the detecting unit is arranged at the first rotating connection structure and has detected that the angle position between the body and the supporting part meets the first angle position; and
   switching the electronic device into the second operating mode when the detecting unit is arranged at the second rotating connection structure and has detected that the angle position between the supporting part and the base meets the second angle position.

7. The electronic device according to claim 6, wherein the surface of the display is substantially parallel to the surface of the base and the bracket and facing the surface of the base, and the display surface of the display is facing away from the base, when the electronic device is in the second operating mode.

* * * * *